(12) United States Patent
Wang et al.

(10) Patent No.: US 9,776,249 B2
(45) Date of Patent: Oct. 3, 2017

(54) METHOD OF MANUFACTURING SILVER NANOWIRES

(71) Applicant: Dow Global Technologies LLC, Midland, MI (US)

(72) Inventors: Wei Wang, Midland, MI (US); Patrick T. McGough, Midland, MI (US); Janet M. Goss, Saginaw, MI (US); George L. Athens, Freeland, MI (US); Jonathan D. Lunn, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 227 days.

(21) Appl. No.: 14/881,859

(22) Filed: Oct. 13, 2015

(65) Prior Publication Data

US 2016/0114396 A1    Apr. 28, 2016

Related U.S. Application Data

(60) Provisional application No. 62/069,430, filed on Oct. 28, 2014.

(51) Int. Cl.
*B22F 9/24* (2006.01)
*B82Y 40/00* (2011.01)
*B22F 1/00* (2006.01)

(52) U.S. Cl.
CPC .............. *B22F 9/24* (2013.01); *B22F 1/0025* (2013.01); *B22F 2301/255* (2013.01); *B82Y 40/00* (2013.01); *Y10S 977/762* (2013.01); *Y10S 977/896* (2013.01)

(58) Field of Classification Search
None
See application file for complete search history.

(56) References Cited

U.S. PATENT DOCUMENTS

| | | | | |
|---|---|---|---|---|
| 7,575,621 | B2 * | 8/2009 | Vanheusden | B22F 1/0018 75/351 |
| 7,585,349 | B2 | 9/2009 | Xia et al. | |
| 7,749,299 | B2 | 7/2010 | Vanheusden et al. | |
| 7,922,787 | B2 | 4/2011 | Wang et al. | |
| 8,727,112 | B2 | 5/2014 | Young et al. | |
| 8,876,937 | B2 | 11/2014 | Peng et al. | |
| 9,034,075 | B2 * | 5/2015 | Lunn | B22F 9/24 75/370 |
| 2008/0032047 | A1 | 2/2008 | Parashar et al. | |
| 2009/0242231 | A1 | 10/2009 | Miyagishima et al. | |
| 2009/0311530 | A1 | 12/2009 | Hirai et al. | |
| 2010/0078197 | A1 * | 4/2010 | Miyagishima | B22F 1/0025 174/128.1 |
| 2010/0242679 | A1 | 9/2010 | Yu et al. | |
| 2010/0269635 | A1 * | 10/2010 | Vanheusden | B22F 1/0022 75/370 |
| 2013/0008690 | A1 * | 1/2013 | Wiley | H01B 1/026 174/120 C |
| 2013/0255444 | A1 | 10/2013 | Kawaguchi | |
| 2013/0283974 | A1 | 10/2013 | Lunn et al. | |
| 2013/0334075 | A1 | 12/2013 | Young et al. | |
| 2014/0231282 | A1 | 8/2014 | Young et al. | |

FOREIGN PATENT DOCUMENTS

| | | |
|---|---|---|
| TW | 201024002 | 7/2010 |
| WO | 03032084 | 4/2003 |

OTHER PUBLICATIONS

Korte, et al., Rapid synthesis of silver nanowires through a CuCl- or CuCl2-mediated polyol process, Journal of Materials Chemistry 18, pp. 437-441, (2007).
He, et al., Synthesis and characterization of silver nanowires with zigzag morphology in N,N dimethylformamide, Journal of Solid State Chemistry 180, pp. 2262-2267 (2007).
Zhao, et al., Synthesis and formation mechanism of silver nanowires by a templateless and seedless method, Chemistry Letters, vol. 34, No. 1, pp. 30-31 (2005).
Tang, et al., One-dimensional assemblies of nanoparticles: preparation, properties, and promise, Acvanced Materials 17, No. 8, pp. 951-962 (2005).
Xiong, et al., Formation of silver nanowires through a sandwiched reduction process, Acvanced Materials 15, No. 5, pp. 405-408 (2003).
Sarkar, et al., Effective chemical route for the synthesis of silver nanostructures in formamide, Res. Chem. Intermed 35, pp. 71-78 (2009).
Pastoriza-Santos, et al., Self-assembly of silver particle monolayers on glass from Ag+ solutions in DMG, J. of Colloid and Interface Science 221, pp. 236-241 (2000).
Mdluli, et al., an improved N,N-dimethylformamide and polyvinyl pyrrolidone approach for the synthesis of long silver nanowires, Journal of Alloys and Compounds 469, No. 5, pp. 519-522 (2009).
Walther, et al., Structure-tunable bidirectional hybrid nanowires via multicompartment cylinders, Nano Letters vol. 9, No. 5, pp. 2026-2030 (2009).
Pastoriza-Santos, et al., N,N-Dimethylformamide as a reaction medium for metal nanoparticle synthesis, Advanced Functional Materials 19, pp. 679-688 (2009).
Sun, et al., Polyol synthesis of uniform silver nanowires: a plausible growth mechanism and the supporting evidence, Nano Letters, vol. 3, No. 7, pp. 955-960 (2003).
Wiley, et al., Polyol synthesis of silver nanostructures: control of product morphology with Fe(II) or Fe(III) species, Langmuir, vol. 21, No. 18, pp. 8077-8080 (2005).
Ducamp-Sanguese, et al., Synthesis and characterization of fine monodisperse silver particles of uniform shape 100, pp. 272-280.
Wiley, et al., Synthesis of silver nanostructures with controlled shapes and properties 40, pp. 1067-1076 (2007).
Giersig, et al., Evidence of an aggregate mechanism during the formation of silver nanowires in N,N-dimethylformamide, J. Mater. Chem. 14, pp. 607-610 (2004).
Zhao, et al., Low temperature synthesis and growth mechanism of silver nanowires by a soft-chemistry method, Acta Chimica Sinica, vol. 61, No. 10, pp. 1671-1674 (2003).

(Continued)

Primary Examiner — George Wyszomierski
(74) Attorney, Agent, or Firm — Thomas S. Deibert

(57) ABSTRACT

A process for manufacturing silver nanowires is provided, wherein the recovered silver nanowires have a high aspect ratio; and, wherein the total glycol concentration is <0.001 wt % at all times during the process.

10 Claims, No Drawings

(56) References Cited

OTHER PUBLICATIONS

Pallavicine, et al., Self-assembled monolayers of silver nanoparticles firmly grafted on glass surfaces: low Ag+ release for an efficent antibacterial activity, J. of Colloid and Interface Science 350, pp. 110-116 (2010).
Pastoriza-Santos, et al., Formation and Stabilization of Silver Nanoparticles through Reduction by N,N-Dimethylformamide, Langmuir 15, pp. 948-951 (1999).
Copending U.S. Appl. No. 14/881,890.
Copending U.S. Appl. No. 14/881,924.
Copending U.S. Appl. No. 14/881,955.

* cited by examiner

METHOD OF MANUFACTURING SILVER NANOWIRES

This application claims priority to United States Provisional Application No. 62/069,430 filed on Oct. 28, 2014.

The present invention relates generally to the field of manufacture of silver nanowires. In particular, the present invention is directed to a method of manufacturing silver nanowires having a high aspect ratio for use in various applications.

Films that exhibit a high conductivity in combination with a high transparency are of great value for use as electrodes or coatings in a wide range of electronic applications, including, for example, touch screen displays and photovoltaic cells. Current technology for these applications involves the use of a tin doped indium oxide (ITO) containing films that are deposited through physical vapor deposition methods. The high capital cost of physical vapor deposition processes has led to the desire to find alternative transparent conductive materials and coating approaches. The use of silver nanowires dispersed as a percolating network has emerged as a promising alternative to ITO containing films. The use of silver nanowires potentially offer the advantage of being processable using roll to roll techniques. Hence, silver nanowires offer the advantage of low cost manufacturing with the potential of providing higher transparency and conductivity than conventional ITO containing films.

The "polyol process" has been disclosed for the manufacture of silver nanostructures. The polyol process uses ethylene glycol (or an alternative glycol) as both a solvent and a reducing agent in the production of silver nanowires. The use of glycols; however, has several inherent disadvantages. Specifically, using glycol as both the reducing agent and the solvent results in a decrease in control over the reaction as the principal reducing agent species (glycolaldehyde) is produced in situ and its presence and concentration are dependent on the extent of exposure to oxygen. Also, the use of glycol introduces the potential for the formation of combustible glycol/air mixtures in the headspace of the reactor used to produce the silver nanowires. Finally, the use of large volumes of glycol create disposal concerns, increasing the cost of commercializing such operations.

One alternative approach to the polyol process for manufacturing silver nanowires has been disclosed by Miyagishima, et al. in United States Patent Application Publication No. 20100078197. Miyagishima, et al. disclose a method for producing metal nanowires, comprising: adding a solution of a metal complex to a water solvent containing at least a halide and a reducing agent, and heating a resultant mixture at 150° C. or lower, wherein the metal nanowires comprise metal nanowires having a diameter of 50 nm or less and a major axis length of 5 μm or more in an amount of 50% by mass or more in terms of metal amount with respect to total metal particles.

Another alternative approach to the polyol process for manufacturing silver nanowires has been disclosed by Lunn, et al. in United States Patent Application Publication No. 20130283974. Lunn, et al. disclose a process for manufacturing high aspect ratio silver nanowires, wherein the recovered silver nanowires exhibit an average diameter of 25 to 80 nm and an average length of 10 to 100 μm; and, wherein the total glycol concentration is <0.001 wt % at all times during the process.

Notwithstanding, there remains a need for alternative silver nanowire manufacturing methods. In particular, for methods of manufacturing silver nanowires without the use of glycol, wherein the silver nanowires produced have a high aspect ratio (preferably >500) and wherein the production of undesired silver nanoparticles having an aspect ratio of <3 is minimized.

The present invention provides a process for manufacturing high aspect ratio silver nanowires, comprising: providing a container; providing water; providing a reducing sugar; providing a polyvinyl pyrrolidone (PVP); providing a source of copper (II) ions; providing a source of halide ions; providing a source of silver ions; providing a pH adjusting agent; adding the water, the reducing sugar, the polyvinyl pyrrolidone (PVP), the source of copper (II) ions, the source of halide ions, and the pH adjusting agent to the container to form a combination, wherein the combination has a pH of 2.0 to 4.0; heating the combination to 110 to 160° C.; then adding the source of silver ions to the container to form a growth mixture; then maintaining the growth mixture at 110 to 160° C. for a hold period of 2 to 30 hours to provide a product mixture; and, recovering a plurality of high aspect ratio silver nanowires from the product mixture; and, wherein a total glycol concentration in the container is <0.001 wt % at all times during the process.

The present invention provides a process for manufacturing high aspect ratio silver nanowires, comprising: providing a container; providing water; providing a reducing sugar; providing a polyvinyl pyrrolidone (PVP); providing a source of copper (II) ions; providing a source of halide ions; providing a source of silver ions; providing a pH adjusting agent; adding the water, the reducing sugar, the polyvinyl pyrrolidone (PVP), the source of copper (II) ions, the source of halide ions, and the pH adjusting agent to the container to form a combination, wherein the combination has a pH of 2.0 to 4.0; heating the combination to 110 to 160° C.; then adding the source of silver ions to the container to form a growth mixture; maintaining the growth mixture at 110 to 160° C. for a hold period of 2 to 30 hours to provide a product mixture; and, recovering a plurality of high aspect ratio silver nanowires from the product mixture; wherein a total glycol concentration in the container is <0.001 wt % at all times during the process; and, wherein the plurality of high aspect ratio silver nanowires recovered have an average diameter of 25 to 80 nm and an average length of 10 to 100 μm.

The present invention provides a process for manufacturing high aspect ratio silver nanowires, comprising: providing a container; providing water; providing a reducing sugar; providing a polyvinyl pyrrolidone (PVP); providing a source of copper (II) ions; providing a source of halide ions; providing a source of silver ions; providing a pH adjusting agent; adding the water, the reducing sugar, the polyvinyl pyrrolidone (PVP), the source of copper (II) ions, the source of halide ions, and the pH adjusting agent to the container to form a combination, wherein the combination has a pH of 2.0 to 4.0; dividing the source of silver ions into a first portion and a second portion; heating the combination to 140 to 160° C.; then adding the first portion to the container to form a creation mixture; then cooling the creation mixture to 110 to 135° C. during a delay period; following the delay period, adding the second portion to the container to form a growth mixture; maintaining the growth mixture at 110 to 160° C. for a hold period of 2 to 30 hours to provide a product mixture; and, recovering a plurality of high aspect ratio silver nanowires from the product mixture; and, wherein a total glycol concentration in the container is <0.001 wt % at all times during the process.

The present invention provides a process for manufacturing high aspect ratio silver nanowires, comprising: providing a container; providing water; providing a reducing sugar; providing a polyvinyl pyrrolidone (PVP); providing a source of copper (II) ions; providing a source of halide ions; providing a source of silver ions; providing a pH adjusting agent; adding the water, the reducing sugar, the polyvinyl pyrrolidone (PVP), the source of copper (II) ions, the source of halide ions, and the pH adjusting agent to the container to form a combination, wherein the combination has a pH of 2.0 to 4.0; dividing the source of silver ions into a first portion and a second portion; heating the combination to 140 to 160° C., then adding the first portion to the container to form a creation mixture; then cooling the creation mixture to 110 to 135° C. during a delay period; following the delay period, adding the second portion to the container to form a growth mixture; maintaining the growth mixture at 110 to 135° C. for a hold period of 2 to 30 hours; and, recovering a plurality of high aspect ratio silver nanowires from the product mixture; wherein a total glycol concentration in the container is <0.001 wt % at all times during the process.

The present invention provides a process for manufacturing high aspect ratio silver nanowires, comprising: providing a container; providing water; providing a reducing sugar, wherein the reducing sugar provided is glucose; providing a polyvinyl pyrrolidone (PVP), wherein the polyvinyl pyrrolidone (PVP) provided has a weight average molecular weight, $M_w$, of 40,000 to 60,000 Daltons; providing a source of copper (II) ions, wherein the source of copper (II) ions provided is copper (II) chloride; providing a source of halide ions, wherein the source of halide ions provided is sodium chloride; providing a source of silver ions, wherein the source of silver ions provided is silver nitrate; providing a pH adjusting agent; adding the water, the reducing sugar, the polyvinyl pyrrolidone (PVP), the source of copper (II) ions, the source of halide ions, and the pH adjusting agent to the container to form a combination, wherein the combination has a pH of 2.0 to 4.0; dividing the source of silver ions into a first portion and a second portion; heating the combination to 140 to 160° C., then adding the first portion to the container to form a creation mixture; then cooling the creation mixture to 110 to 135° C., during a delay period; following the delay period, adding the second portion to the container to form a growth mixture; maintaining the growth mixture at 110 to 135° C. for a hold period of 2 to 30 hours; and, recovering a plurality of high aspect ratio silver nanowires from the product mixture; wherein a total glycol concentration in the container is <0.001 wt % at all times during the process.

The present invention provides a process for manufacturing high aspect ratio silver nanowires, comprising: providing a container; providing water; providing a reducing sugar, wherein the reducing sugar provided is D-glucose; providing a polyvinyl pyrrolidone (PVP), wherein the polyvinyl pyrrolidone (PVP) provided has a weight average molecular weight, $M_w$, of 40,000 to 60,000 Daltons; providing a source of copper (II) ions, wherein the source of copper (II) ions provided is copper (II) chloride; providing a source of halide ions, wherein the source of halide ions provided is sodium chloride; providing a source of silver ions, wherein the source of silver ions provided is silver nitrate; providing a pH adjusting agent; adding the water, the reducing sugar, the polyvinyl pyrrolidone (PVP), the source of copper (II) ions, the source of halide ions, and the pH adjusting agent to the container to form a combination, wherein the combination has a pH of 2.0 to 4.0; dividing the source of silver ions into a first portion and a second portion, wherein the first portion is 10 to 30 wt % of the source of silver ions provided; heating the combination to 145 to 155° C., then adding the first portion to the container to form a creation mixture; then cooling the creation mixture to 125 to 135° C. during a delay period of 5 to 15 minutes; following the delay period, adding the second portion to the container to form a growth mixture; maintaining the growth mixture at 125 to 135° C. for a hold period of 16 to 20 hours; and, recovering a plurality of high aspect ratio silver nanowires from the product mixture; wherein a total glycol concentration in the container is <0.001 wt % at all times during the process; wherein a weight ratio of polyvinyl pyrrolidone (PVP) to silver ions added to the container is 6:1 to 7:1; wherein a weight ratio of halide ions to copper (II) ions added to the container is 2.5:1 to 3.5:1; wherein the plurality of high aspect ratio silver nanowires recovered have an average diameter of 35 to 50 nm and an average length of 40 to 100 μm; and, wherein the plurality of high aspect ratio silver nanowires recovered have an average aspect ratio of >500.

DETAILED DESCRIPTION

A process for manufacturing high aspect ratio silver nanowires has been found which provides silver nanowires having an average diameter of 25 to 60 nm and an average length of 35 to 100 μm, while avoiding the inherent disadvantages associated with the use of glycols and while also reducing the fraction of silver nanoparticles produced having an aspect ratio of <3. It is difficult to separate high aspect ratio silver nanowires from silver nanoparticles having an aspect ratio of <3. Accordingly, it is believed to be of significant benefit to have a process wherein the formation of silver nanoparticles produced having an aspect ratio of <3 is minimized such that the silver nanoparticle fraction, $NP_F$, for the silver nanowires produced is <0.2 (as determined according the to method described herein in the Examples).

The term "total glycol concentration" as used herein and in the appended claims in reference to the container contents means combined total of the concentration of all glycols (e.g., ethylene glycol, propylene glycol, butylene glycol, poly(ethylene glycol), poly(propylene glycol)) present in the container.

The term "high aspect ratio" as used herein and in the appended claims in reference to the recovered silver nanowires means that the average aspect ratio of the recovered silver nanowires is >500.

The term "silver nanoparticle fraction" or "$NP_F$" used herein and in the appended claims is the silver nanowire fraction of a sample of silver nanowires determined according to the following equation:

$$NP_F = NP_A/T_A$$

wherein $T_A$ is the total surface area of a substrate that is occluded by a given deposited sample of silver nanowires; and, $NP_A$ is the portion of the total occluded surface area that is attributable to silver nanoparticles having an aspect ratio of <3 included in the deposited sample of silver nanowires.

Preferably, the process for manufacturing high aspect ratio silver nanowires of the present invention, comprises: providing a container; providing water; providing a reducing sugar; providing a polyvinyl pyrrolidone (PVP); providing a source of copper (II) ions; providing a source of halide ions; providing a source of silver ions; providing a pH adjusting agent; adding the water, the reducing sugar, the polyvinyl pyrrolidone (PVP), the source of copper (II) ions, the source of halide ions, and the pH adjusting agent to the container to form a combination, wherein the combination has a pH of 2.0 to 4.0 (preferably, of 2.2 to 3.3); heating the combination to 110 to 160° C.; then adding the source of silver ions to the container (preferably with agitation) to form a growth mixture; maintaining the growth mixture at 110 to 160° C. for a hold period of 2 to 30 hours to provide a product mixture; and, recovering a plurality of high aspect ratio silver nanowires from the product mixture; wherein a total glycol concentration in the container is <0.001 wt % at all times during the process. Preferably, wherein a weight ratio of polyvinyl pyrrolidone (PVP) to silver ions added to the container is 4:1 to 10:1; and, wherein a weight ratio of halide ions to copper (II) ions added to the container is 1:1 to 5:1. Preferably, wherein the plurality of high aspect ratio silver nanowires recovered have an average diameter of 25 to 80 nm and an average length of 10 to 100 μm. Preferably, wherein the plurality of high aspect ratio silver nanowires recovered have an average aspect ratio >500 (more preferably, ≥800; most preferably, ≥1,000).

Preferably, the water provided in the process for manufacturing high aspect ratio silver nanowires of the present invention is at least one of deionized and distilled to limit incidental impurities. More preferably, the water provided in the process for manufacturing high aspect ratio silver nanowires of the present invention is deionized and distilled. Most preferably, the water provided in the process for manufacturing high aspect ratio silver nanowires of the present invention is ultrapure water that meets or exceeds the Type 1 water requirements according to ASTM D1193-99e1 (Standard Specification for Reagent Water).

Preferably, the reducing sugar provided in the process for manufacturing high aspect ratio silver nanowires of the present invention is selected from the group consisting of at least one of aldoses (e.g., glucose, glyceraldehyde, galactose, mannose); disaccharides with a free hemiacetal unit (e.g., lactose and maltose); and ketone bearing sugars (e.g., fructose). More preferably, the reducing sugar provided in the process for manufacturing high aspect ratio silver nanowires of the present invention is selected from the group consisting of at least one of an aldose, lactose, maltose and fructose. Still more preferably, the reducing sugar provided in the process for manufacturing high aspect ratio silver nanowires of the present invention is selected from the group consisting of at least one of glucose, glyceraldehyde, galactose, mannose, lactose, fructose and maltose. Most preferably, the reducing sugar provided in the process for manufacturing high aspect ratio silver nanowires of the present invention is D-glucose.

Preferably, the polyvinyl pyrrolidone (PVP) provided in the process for manufacturing high aspect ratio silver nanowires of the present invention has a weight average molecular weight, $M_w$, of 20,000 to 300,000 Daltons. More preferably, the polyvinyl pyrrolidone (PVP) provided in the process for manufacturing high aspect ratio silver nanowires of the present invention has a weight average molecular weight, $M_w$, of 30,000 to 200,000 Daltons. Most preferably, the polyvinyl pyrrolidone (PVP) provided in the process for manufacturing high aspect ratio silver nanowires of the present invention has a weight average molecular weight, $M_w$, of 40,000 to 60,000 Daltons.

Preferably, the source of copper (II) ions provided in the process for manufacturing high aspect ratio silver nanowires of the present invention is selected from the group consisting of at least one of $CuCl_2$ and $Cu(NO_3)_2$. More preferably, the source of copper (II) ions provided in the process for manufacturing high aspect ratio silver nanowires of the present invention is selected from the group consisting of $CuCl_2$ and $Cu(NO_3)_2$. Most preferably, the source of copper (II) ions provided in the process for manufacturing high aspect ratio silver nanowires of the present invention is $CuCl_2$, wherein the $CuCl_2$ is a copper (II) chloride dihydrate.

Preferably, the source of halide ions provided in the process for manufacturing high aspect ratio silver nanowires of the present invention is selected from the group consisting of at least one of a source of chloride ions, a source of fluoride ions, a source of bromide ions and a source of iodide ions. More preferably, the source of halide ions provided in the process for manufacturing high aspect ratio silver nanowires of the present invention is selected from the group consisting of at least one of a source of chloride ions and a source of fluoride ions. Still more preferably, the source of halide ions provided in the process for manufacturing high aspect ratio silver nanowires of the present invention is a source of chloride ions. Most preferably, the source of halide ions provided in the process for manufacturing high aspect ratio silver nanowires of the present invention is a source of chloride ions, wherein the source of chloride ions is an alkali metal chloride. Preferably, the alkali metal chloride is selected from the group consisting of at least one of sodium chloride, potassium chloride and lithium chloride. More preferably, the alkali metal chloride is selected from the group consisting of at least one of sodium chloride and potassium chloride. Most preferably, the alkali metal chloride is sodium chloride.

Preferably, the source of silver ions provided in the process for manufacturing high aspect ratio silver nanowires of the present invention is a silver complex. More Preferably, the source of silver ions provided in the process for manufacturing high aspect ratio silver nanowires of the present invention is a silver complex; wherein the silver complex is selected from the group consisting of at least one of silver nitrate ($AgNO_3$) and silver acetate ($AgC_2H_3O_2$). Most preferably, the source of silver ions provided in the process for manufacturing high aspect ratio silver nanowires of the present invention is silver nitrate ($AgNO_3$). Preferably, the source of silver ions provided in the method for manufacturing high aspect ratio silver nanowires of the present invention has a silver concentration of 0.005 to 1 molar (M)(more preferably, of 0.01 to 1 M; most preferably, of 0.4 to 1 M).

Preferably, the pH adjusting agent provided in the process for manufacturing high aspect ratio silver nanowires of the present invention is an acid. More preferably, the pH adjusting agent provided in the process for manufacturing high aspect ratio silver nanowires of the present invention is an acid, wherein the acid is selected from the group consisting of at least one of inorganic acids (e.g., nitric acid, sulfuric acid, hydrochloric acid, fluorosulfuric acid, phosphoric acid, fluoroantimonic acid) and organic acids (e.g., methane sulfonic acid, ethane sulfonic acid, benzene sulfonic acid, acetic acid, fluoroacetic acid, chloroacetic acid, citric acid, gluconic acid, lactic acid). Preferably, the pH adjusted agent provided in the process for manufacturing high aspect ratio silver nanowires of the present invention has a pH of <2.0. Still more preferably, the pH adjusting agent provided in the process for manufacturing high aspect ratio silver nanowires of the present invention includes nitric acid. Most preferably, the pH adjusting agent provided in the process for manufacturing high aspect ratio silver nanowires of the present invention is aqueous nitric acid.

Preferably, in the process for manufacturing high aspect ratio silver nanowires of the present invention, the water, the reducing sugar, the polyvinyl pyrrolidone (PVP), the source of copper (II) ions, the source of halide ions and the pH adjusting agent are added to a container (preferably, wherein the container is a reactor; more preferably, wherein the container is a reactor outfitted with an agitator) to form a combination; and then, the source of silver ions are added to the combination in the container (preferably, with agitation) to form a growth mixture while maintaining the combination at 110 to 160° C. (preferably, 125 to 155° C.; more preferably, 130 to 150° C.) during addition of the source of silver ions and after addition of the source of silver ions for a hold period of 2 to 30 hours (preferably, 4 to 30 hours; more preferably 10 to 25 hours; most preferably, 16 to 20 hours) to provide the product mixture.

Preferably, the water, the reducing sugar, the polyvinyl pyrrolidone (PVP), the source of copper (II) ions, the source of halide ions and the pH adjusting agent are added to the container in any order in individual sequence (i.e., one at a time), simultaneously (i.e., all at the same time), or semi-simultaneously (i.e., some individually one at a time, some simultaneously at the same time or as subcombinations). More preferably, at least two of the water, the reducing sugar, the polyvinyl pyrrolidone (PVP), the source of copper (II) ions, the source of halide ions and the pH adjusting agent are mixed together to form a subcombination before addition to the container.

Preferably, the water is divided into at least two volumes of water (more preferably, at least three volumes of water; most preferably, at least four volumes of water) to facilitate the formation of at least two subcombinations that include water before addition to the container. More preferably, the water is divided into at least four volumes of water, wherein a first volume of water is combined with the reducing sugar and the polyvinyl pyrrolidone (PVP) to form a reducing sugar/PVP subcombination, wherein a second volume of water is combined with the source of copper (II) ions to form a copper (II) ion subcombination, wherein a third volume of water is combined with the source of halide ions to form a halide ion subcombination and wherein a forth volume of water is combined with the source of silver ions to form a silver ion subcombination. Preferably, the reducing sugar/PVP subcombination, the copper (II) ion subcombination, the halide ion subcombination and the pH adjusting agent are added to the container in any order in individual sequence (i.e., one at a time), simultaneously (i.e., all at the same time), or semi-simultaneously (i.e., some individually one at a time, some simultaneously at the same time or as further subcombinations) to form the combination. More preferably, the reducing sugar/polyvinyl pyrrolidone (PVP) subcombination is added to the container, followed by the addition to the container of the copper (II) ion subcombination, the halide ion subcombination and the pH adjusting agent in any order in individual sequence (i.e., one at a time), simultaneously (i.e., all at the same time), or semi-simultaneously (i.e., some individually one at a time, some simultaneously at the same time or as further subcombinations) to form the combination. Most preferably, the reducing sugar/polyvinyl pyrrolidone (PVP) subcombination is added to the container, followed by the addition of the copper (II) ion subcombination to the container, followed by the addition of the halide ion subcombination to the container, followed by the addition of the pH adjusting agent to the container to form the combination. The silver ion subcombination is then added to the combination in the container.

Preferably, in the process for manufacturing high aspect ratio silver nanowires of the present invention, a total glycol concentration in the container is <0.001 wt % at all times during the process.

Preferably, in the process for manufacturing high aspect ratio silver nanowires of the present invention, the weight ratio of polyvinyl pyrrolidone (PVP) to silver added to the container is 4:1 to 10:1 (more preferably, 5:1 to 8:1; most preferably, 6:1 to 7:1).

Preferably, in the process for manufacturing high aspect ratio silver nanowires of the present invention, the weight ratio of halide ions to the copper (II) ions added to the container is 1:1 to 5:1 (more preferably, 2:1 to 4:1; most preferably, 2.5:1 to 3.5:1).

Preferably, in the process for manufacturing high aspect ratio silver nanowires of the present invention, the plurality of high aspect ratio silver nanowires recovered from the product mixture have an average diameter of 25 to 80 nm (more preferably, 25 to 60 nm; most preferably, 35 to 50 nm) and an average length of 10 to 100 μm (preferably, 20 to 100 μm; more preferably, >20 to 100 μm). Preferably, the plurality of high aspect ratio silver nanowires recovered from the product mixture have an average aspect ratio of >500.

Preferably, in the process for manufacturing high aspect ratio silver nanowires of the present invention, the plurality of high aspect ratio silver nanowires recovered from the product mixture have a silver nanoparticle fraction, $NP_F$, of <0.2 (preferably, <0.17; more preferably, <0.15; most preferably, <0.13) (as determined according the to method described herein in the Examples).

Preferably, the process for manufacturing high aspect ratio silver nanowires of the present invention, further comprises: dividing the source of silver ions provided into at least two individual portions, wherein the individual portions are added to the container with a delay period (preferably, of 1 to 60 minutes; more preferably, of 1 to 20 minutes; most preferably of 5 to 15 minutes) between the individual portion additions. More preferably, the method of the present invention further comprises: dividing the source of silver ions provided into a first portion and a second portion (preferably, wherein the first portion is 10 to 30 wt % of the source of silver ions provided; more preferably, wherein the first portion is 15 to 25 wt % of the source of silver ions provided; most preferably, wherein the first portion is 20 wt % of the source of silver ions provided); heating the combination to 140 to 160° C. (preferably, 145 to 155° C.) before adding the first portion to the container to form a creation mixture; and then cooling the creation mixture to 110 to 150° C. (preferably, 110 to 135° C.; more preferably, 125 to 135° C.) during a delay period (preferably, of 1 to 60 minutes; more preferably, of 1 to 20 minutes; most preferably, of 5 to 15 minutes); following the delay period, adding the second portion to the container to form a growth mixture.

Preferably, the process for manufacturing high aspect ratio silver nanowires of the present invention, further comprises: dividing the source of silver ions provided into a first portion and a second portion (preferably, wherein the first portion is 10 to 30 wt % of the source of silver ions provided; more preferably, wherein the first portion is 15 to 25 wt % of the source of silver ions provided; most preferably, wherein the first portion is 20 wt % of the source of silver ions provided); heating the combination to 140 to 160° C. (preferably, 145 to 155° C.) before adding the first portion to the container to form a creation mixture; then cooling the creation mixture to 110 to 150° C. (preferably, 110 to 135° C.; more preferably, 125 to 135° C.) during a delay period (preferably, of 1 to 60 minutes; more preferably, of 1 to 20 minutes; most preferably, of 5 to 15 minutes); following the delay period, adding the second portion to the container to form a growth mixture; and, maintaining the growth mixture at 110 to 150° C. (preferably, 110 to 135° C.; more preferably, 125 to 135° C.) for a hold period of 2 to 30 hours (preferably, 4 to 30 hours; more preferably 10 to 25 hours; most preferably, 16 to 20 hours) to provide a product mixture.

Some embodiments of the present invention will now be described in detail in the following Examples.

The water used in the following Examples was obtained using a ThermoScientific Barnstead NANOPure purification system with a 0.2 µm pore size hollow fiber filter positioned downstream of the water purification unit.

Example 1: Preparation of Reducing Sugar/PVP Containing Subcombination

Polyvinyl pyrrolidone (PVP) having a weight average molecular weight, $M_w$, of 55,000 Daltons (52.2 g; >98% from Sigma-Aldrich) was dissolved in 1,958 mL of deionized water in a flask. Then D-glucose (13.5 g; >99% from Sigma-Aldrich) was added to the contents of the flask with stirring until dissolved to form a reducing sugar/PVP subcombination.

Example 2: Preparation of Copper (II) Ion Containing Subcombination

Copper (II) chloride (0.6137 g; >99% from Mallinckrodt Chemicals) was dissolved in 900 mL of deionized water to form a copper (II) ion subcombination in a beaker.

Example 3: Preparation of Halide Ion Containing Subcombination

Sodium chloride (0.2104 g) was dissolved in 900 mL of deionized water to form a halide ion subcombination in a beaker.

Example 4: Preparation of Silver Ion Containing Subcombination

Silver nitrate (12.70 g; >99% from Sigma-Aldrich) was dissolved in 612 mL of deionized water to form a silver ion subcombination in a flask.

Comparative Example C1: Preparation of Silver Nanowires

An 8 L stainless steel pressure reactor outfitted with an overhead mixer and a temperature controller was used. A portion (21.3 mL) of a halide ion subcombination prepared according to Example 3 was added to a reducing sugar/PVP subcombination prepared according to Example 1 in a flask. A portion (21.3 mL) of a copper (II) ion subcombination prepared according to Example 2 was then added to the flask. The glassware used in the measurement of the halide ion subcombination and the copper (II) ion subcombination was then rinsed with deionized water (407 mL) into the flask. The contents of the flask were then transferred to the reactor. The flask was then rinsed with deionized water (191 mL) into the reactor. The pH of the reactor contents was observed to be 3.86. The mixer was engaged at a stirring rate of 200 revolutions per minute. The reactor was then closed up and purged with nitrogen 4 times to a pressure of >60 psig with a hold at pressure for three minutes for each purge. The reactor was left with a nitrogen blanket at 16.8 psig following the final purge. The temperature controller was then set at 150° C. After the reactor contents reached 150° C., 20 wt % of the silver ion subcombination prepared according to Example 4 was added to the reactor over 1 minute. The reactor contents were then stirred for ten minutes while maintaining the set point of the temperature controller at 150° C. Over the following ten minutes, the temperature of the reactor contents was cooled down to 130° C. The remaining 80 wt % of the silver ion subcombination prepared according to Example 4 was then added to the reactor contents over the next ten minutes along with an additional 102 mL of deionized water. The reactor contents were then stirred for eighteen hours while maintaining the set point of the temperature controller at 130° C. The reactor contents were then cooled down to room temperature over the next thirty minutes. The reactor was then vented to relieve and pressure build up in the vessel. The mixer was disengaged. The reactor contents were then collected.

Example 5: Preparation of Silver Nanowires

An 8 liter stainless steel pressure reactor outfitted with a three blade propeller style agitator, a temperature control unit with an external resistive heating mantle and an internal cooling tube to facilitate temperature control was used. A portion (21.3 mL) of a halide ion subcombination prepared according to Example 3 was added to a reducing sugar/PVP subcombination prepared according to Example 1 in a flask. A portion (21.3 mL) of a copper (II) ion subcombination prepared according to Example 2 was then added to the flask. The glassware used in the measurement of the halide ion subcombination and the copper (II) ion subcombination was then rinsed with deionized water (407 mL) into the flask. The pH of the contents of the flask was then adjusted from an initial pH of 3.86 down to a pH of 2.29 with nitric acid (ACS reagent grade 70%). The contents of the flask were then transferred to the reactor. The flask was then rinsed with deionized water (191 mL) into the reactor. The mixer was engaged at a stirring rate of 200 revolutions per minute. The reactor was then closed up and purged with nitrogen 4 times to a pressure of >60 psig with a hold at pressure for three minutes for each purge. The reactor was left with a nitrogen blanket at 16.8 psig following the final purge. The temperature controller was then set at 150° C. After the reactor contents reached 150° C., 20 wt % of the silver ion subcombination prepared according to Example 4 was added to the reactor over 1 minute to form a creation mixture. The creation mixture was then stirred for ten minutes while maintaining the set point of the temperature controller at 150° C. Over the following ten minutes, the set point of the temperature controller was linearly ramped down to 130° C. The remaining 80 wt % of the silver ion subcombination prepared according to Example 4 was then added to the reactor over the next ten minutes along with an additional 102 mL of deionized water to form a growth mixture. The growth mixture was then stirred for eighteen hours while maintaining the set point of the temperature controller at 130° C. to form a product mixture. The product mixture was then cooled down to room temperature over the next thirty minutes. The reactor was then vented to relieve any pressure build up in the vessel. The mixer was disengaged. The product mixture was then collected.

Recovered Silver Nanowire Analysis

The product silver nanowires from Comparative Example C1 and Example 5 were then analyzed using an FEI Nova NanoSEM field emission gun scanning electron microscope (SEM) using FEI's Automated Image Acquisition (AIA) program. A drop of cleaned dispersion was taken from the UV/Vis cuvette and drop-cast onto a silica wafer coated SEM stub before being dried under vacuum. Backscatter electron images were collected using an FEI Nova NanoSEM field emission gun scanning electron microscope. FEI's Automated Image Acquisition (AIA) program was used to move the stage, focus, and collect images. Eighteen images of each sample were acquired at 6 μm horizontal field width. Semi-automated image analysis using ImageJ software categorized objects as wires versus particles based on an aspect ratio of 3. Wire widths were automatically measured as well as the total area of wires in the images. Particles were tabulated for individual size and total area of particles in the images. ImageJ software was also used to determine the silver nanowire diameter in TABLE 1. The average length of the silver nanowires was observed to exceed 20 μm, based on the SEM images obtained for the diameter analysis.

ImageJ software was used to analyze SEM images of the product silver nanowires from each of Comparative Example C1 and Example 5 to provide a relative measure of the silver nanoparticles having an aspect ratio of <3 in the product samples. The statistic used for this measure is the nanoparticle fraction, $NP_F$, determined according to the following expression:

$$NP_F = NP_A/T_A;$$

wherein $T_A$ is the total surface area of the substrate that is occluded by a given deposited sample of silver nanowires; and, $NP_A$ is the portion of the total occluded surface area that is attributable to silver nanoparticles having an aspect ratio of <3.

Spectral UV/Vis analysis of the product silver nanowires from each of Comparative Example C1 and Example 5 was performed using a Shimadzu UV 2401 Spectrophotometer. The raw UV/Vis absorbance spectra were normalized so that the local minimum near 320 nm and the local maximum near 375 nm span the range from 0 to 1. The wavelength of maximum absorbance, $\lambda_{max}$, and the normalized absorbance at 500 nm, $Abs_{500}$, are reported in TABLE 1.

TABLE 1

| Example | Width (nm) | | | $NP_F$ | Spectral Analysis | |
| | Median | Mean | Standard Deviation | | $\lambda_{max}$ nm | $Abs_{500}$ |
| --- | --- | --- | --- | --- | --- | --- |
| C1 | 44.6 | 53.7 | 33.4 | 0.23 | 380 | 0.39 |
| 5 | 38.2 | 47.8 | 35.2 | 0.12 | 378 | 0.27 |

We claim:

1. A process for manufacturing high aspect ratio silver nanowires, comprising:
   providing a container;
   providing water;
   providing a reducing sugar;
   providing a polyvinyl pyrrolidone (PVP);
   providing a source of copper (II) ions;
   providing a source of halide ions;
   providing a source of silver ions;
   providing a pH adjusting agent;
   adding the water, the reducing sugar, the polyvinyl pyrrolidone (PVP), the source of copper (II) ions, the source of halide ions, and the pH adjusting agent to the container to form a combination, wherein the combination has a pH of 2.0 to 4.0;
   heating the combination to 110 to 160° C.;
   then adding the source of silver ions to the container to form a growth mixture;
   then maintaining the growth mixture at 110 to 160° C. for a hold period of 2 to 30 hours to provide a product mixture; and,
   recovering a plurality of high aspect ratio silver nanowires from the product mixture; and,
   wherein a total glycol concentration in the container is <0.001 wt % at all times during the process.

2. The process of claim 1, further comprising:
   dividing the source of silver ions into a first portion and a second portion;
   heating the combination to 140 to 160° C.;
   then adding the first portion to the container to form a creation mixture;
   then cooling the creation mixture to 110 to 135° C. during a delay period;
   following the delay period, adding the second portion to the container to form the growth mixture.

3. The process of claim 2, wherein the growth mixture is maintained at 110 to 135° C. during the hold period.

4. The process of claim 3, wherein the reducing sugar provided is glucose.

5. The process of claim 3, wherein the polyvinyl pyrrolidone (PVP) provided has a weight average molecular weight, $M_W$, of 40,000 to 150,000 Daltons.

6. The process of claim 3, wherein the source of copper (II) ions provided is copper (II) chloride.

7. The process of claim 3, wherein the source of halide ions provided is sodium chloride.

8. The process of claim 3, wherein the source of silver ions provided is silver nitrate.

9. The process of claim 1, further comprising:
   dividing the source of silver ions into a first portion and a second portion;
   heating the combination to 140 to 160° C.;
   then adding the first portion to the container to form a creation mixture;
   then cooling the creation mixture to 110 to 135° C. during a delay period;
   following the delay period, adding the second portion to the container to form the growth mixture; and,
   maintaining the growth mixture at 110 to 135° C. during the hold period;
   wherein the reducing sugar provided is glucose;
   wherein the polyvinyl pyrrolidone (PVP) provided has a weight average molecular weight, $M_W$, of 40,000 to 60,000 Daltons;
   wherein the source of copper (II) ions provided is copper (II) chloride;
   wherein the source of halide ions provided is sodium chloride; and,
   wherein the source of silver ions provided is silver nitrate.

10. The process of claim 1, further comprising:
    dividing the source of silver ions into a first portion and a second portion, wherein the first portion is 10 to 30 wt % of the source of silver ions provided;
    heating the combination to 145 to 155° C.;
    then adding the first portion to the container to form a creation mixture;
    then cooling the creation mixture to 125 to 135° C. during a delay period of 5 to 15 minutes;
    following the delay period, adding the second portion to the container to form the growth mixture; and,
    maintaining the growth mixture at 125 to 135° C. during the hold period, wherein the hold period is 16 to 20 hours;

wherein the reducing sugar provided is D-glucose;

wherein the polyvinyl pyrrolidone (PVP) provided has a weight average molecular weight, $M_w$, of 40,000 to 60,000 Daltons;

wherein the source of copper (II) ions provided is copper (II) chloride;

wherein the source of halide ions provided is sodium chloride;

wherein the source of silver ions provided is silver nitrate; and, wherein a weight ratio of polyvinyl pyrrolidone (PVP) to silver ions added to the container is 6:1 to 7:1; wherein a weight ratio of halide ions to copper (II) added to the container is 2.5:1 to 3.5:1; wherein the plurality of high aspect ratio silver nanowires recovered have an average diameter of 35 to 50 nm and an average length of 20 to 100 μm; and, wherein the plurality of high aspect ratio silver nanowires recovered have an average aspect ratio of >500.

* * * * *